Figure 1:
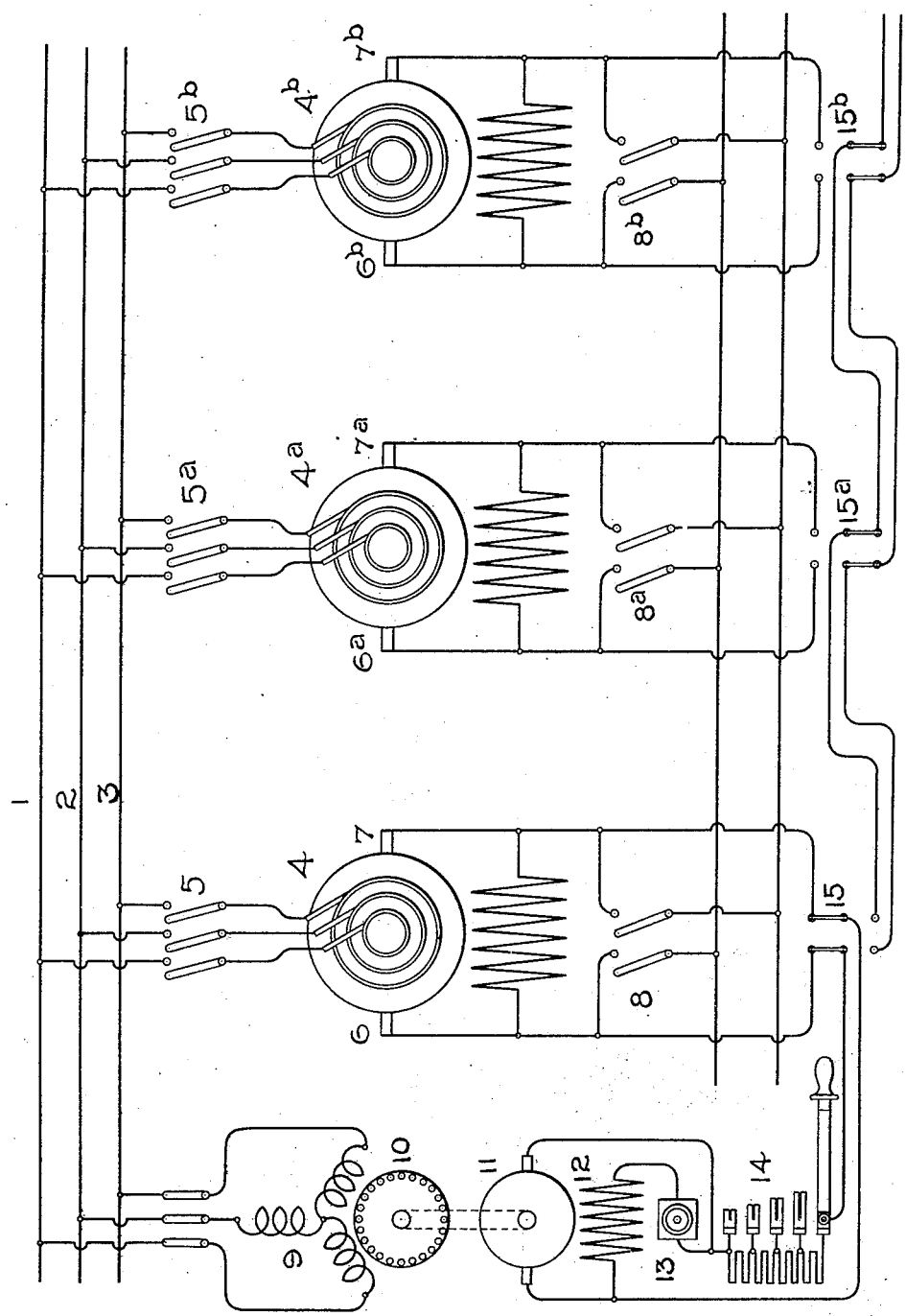

No. 714,395. Patented Nov. 25, 1902.
W. B. POTTER.
STARTING ROTARY CONVERTERS.
(Application filed Sept. 7, 1899.)
(No Model.) 2 Sheets—Sheet 1.

Witnesses.
Arthur H. Abell.
A. F. Macdonald.

Inventor.
William B. Potter,
by Albert G. Davis
Atty.

THE NORRIS PETERS CO., PHOTO-LITHO., WASHINGTON, D. C.

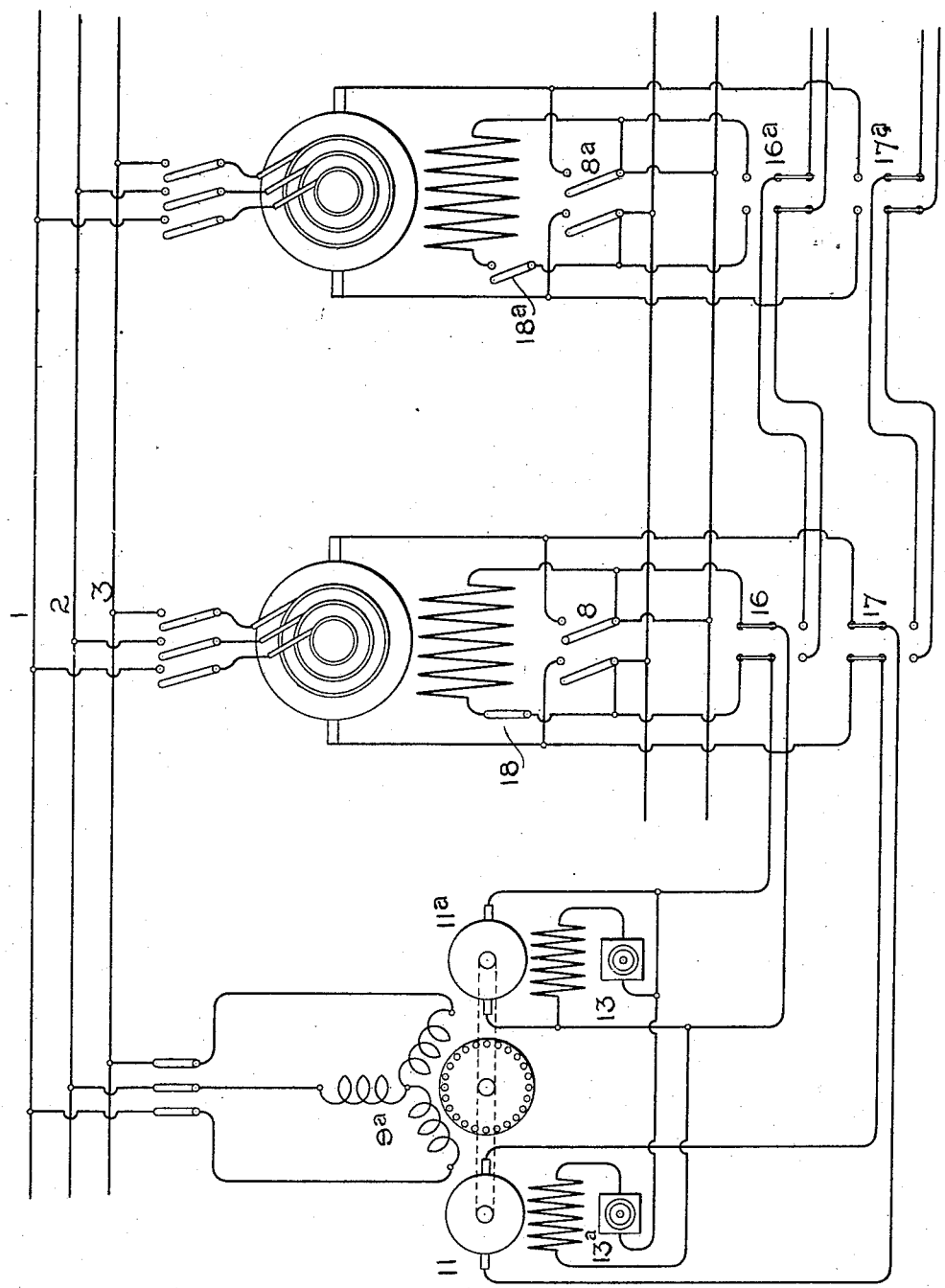

UNITED STATES PATENT OFFICE.

WILLIAM B. POTTER, OF SCHENECTADY, NEW YORK, ASSIGNOR TO THE GENERAL ELECTRIC COMPANY, A CORPORATION OF NEW YORK.

STARTING ROTARY CONVERTERS.

SPECIFICATION forming part of Letters Patent No. 714,395, dated November 25, 1902.

Application filed September 7, 1899. Serial No. 729,709. (No model.)

*To all whom it may concern:*

Be it known that I, WILLIAM B. POTTER, a citizen of the United States, residing at Schenectady, in the county of Schenectady and State of New York, have invented certain new and useful Improvements in Starting Rotary Converters, (Case No. 1,082,) of which the following is a specification.

My present invention relates to means for starting rotary converters, the object being to permit such apparatus to be started in a distributing-station where a direct-current circuit is not available. I accomplish this result by employing an induction-motor driven from the source of alternating-current supply by which a small direct-current generator is operated and employed to start up the rotary converters. By this system I avoid the employment of starting resistances, reactances, or transformers and also avoid the great rush of idle current, which is so serious in practice when rotary converters are started from the alternating-current side.

The motor-generator may be provided with a starting resistance and with an adjustable resistance in its field-magnet circuit for varying its voltage, or the starting resistance may be entirely dispensed with by providing the direct-current side of the motor-generator with two armatures and two independent field-magnets arranged for connection, respectively, with the armatures and field-magnets of the several rotary converters. By this plan of procedure a plurality of rotary converters may be started by the employment of a single auxiliary machine of small capacity as compared with that of the several converters and a single small starting resistance, or with the double-armature arrangement above referred to the starting resistance may be entirely dispensed with.

The several features of novelty will be particularly described hereinafter and will be definitely indicated in the claims.

In the accompanying drawings, which diagrammatically illustrate my invention, Figure 1 is a view of a distributing-station containing a plurality of rotary converters and an auxiliary starting-generator driven by an induction-motor for starting up any of the converters, and Fig. 2 is a modification in which the induction-motor drives two separately-excited direct-current armatures.

Referring first to Fig. 1, 1, 2, and 3 represent the supply-wires of the alternating-current side of a station containing a plurality of rotary converters 4 $4^a$ $4^b$. Current passes from the wires through a three-pole switch 5 $5^a$ $5^b$ and to three ring-contacts, as indicated in the diagram, connecting, respectively, with symmetrical points of the windings of the armatures of the rotary converters the commutated sides of which discharge through brushes 6 7, &c., adapted to be connected by a two-pole switch 8 $8^a$ $8^b$ with a pair of bus-bars communicating with a direct-current-distributing circuit.

In ordinary practice the converter is brought up to speed by current from the alternating mains through a reactance or auto converter, the field-circuit being open, and after synchronous speed is attained or nearly attained the field-circuit is closed and the rotary falls into step, when it can be thrown onto the direct-current mains. This operation in practice is exceedingly difficult and troublesome and requires a current frequently largely exceeding in volume the current which the machine takes in normal operation. Under my present plan, I dispense with these auxiliary starting resistances and employ an auxiliary induction-motor, the rotary magnetic field or primary member of which is indicated at 9 and the secondary member at 10. The latter is indicated as the well-known type of "squirrel-cage" winding, the construction of which is well understood by those familiar with induction-motors. The motor may be fed from the same leads or bus-bars 1 2 3 which supply the rotary converters.

The system is shown as applied to a triphase circuit. It will of course be understood, however, that the invention is applicable to an alternating-current system of any type or number of phases. The rotary member of the induction-motor drives a direct-current armature 11, the field-magnet 12 of which is governed by a variable resistance 13 to vary the potential of the machine. The machine is coupled through an adjustable resistance 14 and a two-pole switch 15 with the direct-current side of the rotary converter 4. Switches 15$^a$ 15$^b$, in series relation with the switch 15, may be employed to start up the converters 4$^a$ and 4$^b$. These several switches are so arranged that only a single converter can be started at a time. The arrangement will be clear from an inspection of the diagram. It shows any switch as drawing current from the non-starting position of the other several switches between it and the starting-generator. No claim is herein made, however, to this arrangement, as it is not of my invention. With this organization when the controlling-switch for the induction-motor is closed the alternating current drives the auxiliary machine 11. The switch 15 may then be closed, assuming that machine 4 is to be started, and placed in the position indicated in the diagram. The starting resistance 14 will then be gradually cut out, thus admitting more current gradually to the direct-current side of the rotary converter and increasing its speed. Its speed may be still further increased by strengthening the field-magnet 12 of the auxiliary generator by suitable adjustment of the regulating-switch 13. When the converter has been raised to a speed where it is in synchronism with the alternating source, the switch 5 may be thrown, and the machine then becomes self-exciting and the switch 15 may be opened. The controlling-switch for the distributing-circuit (shown at 8) may be then closed on the direct-current bus-bars. Similarly, any other machine of the group installed in the station may be started.

With an organization such as above described the several rotary converters may be started one at a time by a small auxiliary machine of from five to ten per cent. the capacity of each rotary converter and with a single auxiliary resistance.

In the plan employed in Fig. 2 the starting resistance 14 is dispensed with and the induction-motor-driven generator is provided with two independent armatures 11 11$^a$, adapted to be independently connected, respectively, with the field-magnet and armature on the direct-current side of the rotary generator. Two independent trains of controlling-switches for the armature and field-magnet are employed, as shown at 16 16$^a$ 17 17$^a$. In the field-magnet circuit is interposed a circuit-breaker or switch 18 18$^a$ to permit the closing of but a single field-magnet circuit at a time when the station is being started up. Switches 8 8$^a$, similar to those described in connection with Fig. 1, for connecting the direct-current side of the several rotary converters with the distributing-bars of the direct-current circuit are provided. Each field-magnet of the auxiliary generator is provided with an independently-regulable resistance 13 13$^a$, both in parallel branches of the armature-circuit, which supplies the field-magnet of the rotary converters. Thus in starting up the machines with this organization the induction-motor 9$^a$ is first started by closing its switch on the alternating-current side. The switch 18 in the field-magnet of the converter is then closed and the switches 16 and 17 put in the position indicated in the diagram, thereby closing the two armature-circuits of the auxiliary generator upon independent circuits of the rotary converter. As the latter accelerates in speed its armature-current may be increased by adjusting the resistance 13$^a$ and increasing the field-magnet strength of the machine 11. As the field-magnet coil 13$^a$ is in shunt to the field-coil 13, it may be built up more gradually than if in circuit with the armature of the rotary converter. The field-regulating resistance 13 may then be adjusted to increase the voltage on the field-magnet of the rotary converter, and when the latter rises to synchronous speed its switch may be thrown so as to couple it in circuit with the alternating-current source of supply.

What I claim as new, and desire to secure by Letters Patent of the United States, is—

1. In a system of electrical distribution, the combination of a plurality of rotary converters, means for coupling them into operative relation to alternating or direct current circuits, a direct-current generator for starting said rotary converters into operation upon the direct-current side, and an induction-motor driven by the alternating-current source for operating said auxiliary generator.

2. A system of electrical distribution, comprising a plurality of rotary converters each connecting on its several sides with direct and alternating current circuits, respectively, controlling-switches for said circuits, an auxiliary starting-generator and switches for connecting it with the direct-current side of the several rotary converters, means for regulating the potential of said generator, and an induction-motor fed from the alternating-current source of supply, for operating said generator.

3. A system of electrical distribution comprising a rotary converter, means for connecting its two sides with direct and alternating current circuits respectively, an auxiliary direct-current starting-generator coupled to an induction-motor in operative relation to the alternating source, said generator being provided with independent windings, means for independently varying the voltage of each winding, and connections for said windings with the field-magnet and armature of the rotary converter on its direct-current side.

4. A system of electrical distribution comprising a plurality of rotary converters, switches for coupling them independently into direct and alternating circuits at the two sides, a direct-current starting-generator provided with two windings of independently-regulable voltage, and a switch in the field-magnet circuit of the several converters.

5. A system of electrical distribution comprising a rotary converter having a direct-current starting-generator provided with armature-windings rotating in independently-regulable fields of force, said windings connecting respectively with the field-magnet and armature of the converter, both field-magnet coils of the starting-machine being connected with the field-magnet-charging circuit of the rotary converter.

6. The combination with a source of alternating current of a rotary converter fed therefrom, means for transforming current from said mains to direct current, and means for causing said direct current to start the rotary converter.

In witness whereof I have hereunto set my hand this 5th day of September, 1899.

WILLIAM B. POTTER.

Witnesses:
ALEX. F. MACDONALD,
EDWARD WILLIAMS, Jr.